United States Patent
Wu

(10) Patent No.: US 11,587,164 B2
(45) Date of Patent: Feb. 21, 2023

(54) METHOD AND SYSTEM FOR CRYPTOCURRENCY MINING CENTER

(71) Applicant: STRAITDEER PTE. LTD., Singapore (SG)

(72) Inventor: Tao Wu, Tempe, AZ (US)

(73) Assignee: STRAITDEER PTE. LTD., Singapore (SG)

( * ) Notice: Subject to any disclaimer, the term of this patent is extended or adjusted under 35 U.S.C. 154(b) by 0 days.

(21) Appl. No.: 17/127,481

(22) Filed: Dec. 18, 2020

(65) Prior Publication Data
US 2021/0192619 A1 Jun. 24, 2021

Related U.S. Application Data

(60) Provisional application No. 62/949,945, filed on Dec. 18, 2019.

(51) Int. Cl.
| | | |
|---|---|---|
| *G06Q 40/04* | (2012.01) | |
| *G06Q 20/06* | (2012.01) | |
| *G06Q 50/06* | (2012.01) | |
| *G06F 1/28* | (2006.01) | |
| *G06F 16/2458* | (2019.01) | |

(Continued)

(52) U.S. Cl.
CPC ............ *G06Q 40/04* (2013.01); *G06F 1/28* (2013.01); *G06F 16/2465* (2019.01); *G06Q 20/0655* (2013.01); *G06Q 20/3678* (2013.01); *G06Q 50/06* (2013.01); *H05K 7/207* (2013.01); *H05K 7/20645* (2013.01); *G06F 2216/03* (2013.01); *G06Q 2220/00* (2013.01)

(58) Field of Classification Search
CPC ...... H04L 47/122; G06Q 50/06; G06Q 10/04; G06Q 40/00; G06Q 10/06
See application file for complete search history.

(56) References Cited

U.S. PATENT DOCUMENTS

| | | | | |
|---|---|---|---|---|
| 8,789,061 | B2 * | 7/2014 | Pavel | G06Q 50/06 718/102 |
| 2018/0366978 | A1 * | 12/2018 | Matan | H02J 3/14 |

(Continued)

FOREIGN PATENT DOCUMENTS

WO WO02015199629 * 12/2015

OTHER PUBLICATIONS

Blockchain: Perspectives and issues Seybou Sakho, Zhang Jianbiao, Firdaous Essaf and Mesmin J. Mbyamm Kiki Department of Computer Science and Technology, Beijing University of Technology, Chaoyang district, Beijing, China (Year: 2019).*

(Continued)

*Primary Examiner* — Richard C Weisberger
(74) *Attorney, Agent, or Firm* — Anova Law Group, PLLC

(57) ABSTRACT

A cryptocurrency mining method and a cryptocurrency mining controller device are provided. The method includes: obtaining electricity price information and cryptocurrency price information; determining operation control parameters of the cryptocurrency mining system according to the electricity price information and the cryptocurrency price information; and controlling an operation of a target group of cryptocurrency miners according to the operation control parameters. The operation includes switching between operation states, and the operation states includes at least a running state and an off state.

16 Claims, 6 Drawing Sheets

(51) Int. Cl.
*G06Q 20/36* (2012.01)
*H05K 7/20* (2006.01)

(56) References Cited

U.S. PATENT DOCUMENTS

2019/0075686 A1* 3/2019 Yu .................... H04L 9/3239
2019/0288513 A1* 9/2019 Nakayama .......... H02J 3/381
2020/0073466 A1* 3/2020 Walsh ................ G06F 1/3287

OTHER PUBLICATIONS

Forecasting in Blockchain-Based Local Energy Markets Michael Kostmann 1, and Wolfgang K. Härdie Energies 2019, 12, 2718; doi:10.3390/en12142718 (Year: 2019).*

* cited by examiner

METHOD AND SYSTEM FOR CRYPTOCURRENCY MINING CENTER

CROSS REFERENCE TO RELATED APPLICATION

This application claims priority to U.S. provisional patent application No. 62/949,945, filed on Dec. 18, 2019, contents of which are incorporated herein by reference in their entirety.

TECHNICAL FIELD

The present disclosure relates to the technical field of digital computing, in particular to method and system for cryptocurrency mining.

BACKGROUND

Cryptocurrency mining is a process that utilizes a long-running, computationally intensive computer program to process and confirm payments on a cryptocurrency network. In addition to running on traditional computers, some participants have designed specialized cryptocurrency mining hardware, also known as miners, that can process transactions and build blocks much more quickly and efficiently than regular computers. Each cryptocurrency miner is competing with all the other miners on the network to be the first one to correctly assemble the outstanding transactions into a block by solving a set of specialized math problems. In exchange for validating the transactions and solving these problems, cryptocurrency miners are rewarded for all of the transactions they process. They receive fees attached to all of the transactions that they successfully validate and include in a block. In addition to transaction fees, miners also receive an additional award for each block they mine. This block reward is also the process by which new cryptocurrencies are created.

Because of the high energy costs for running a powerful cryptocurrency miner, some operators have elected to build data centers known as mining farms in locations where electricity cost is low. These facilities house many mining operations, and the requirements of these facilities are unlike any other computer facility in terms of power consumption and heat removal. The art is continuing to seek ways to improve the architecture for such mining farms to improve efficiency and lower the power consumption of the process.

BRIEF SUMMARY OF THE DISCLOSURE

One aspect of the present disclosure provides a cryptocurrency mining system including a plurality of mining modules. Each mining module includes: a plurality of AntBoxes, each AntBox being a computational unit that houses a plurality of miners for cryptocurrency farming; a transformer configured to convert an input voltage to a working voltage to supply electric power to the plurality of AntBoxes; and a switchgear and a plurality of panelboards configured to connect the AntBoxes with the transformer. The plurality of mining modules has substantially same structure arrangement. The structure arrangement includes: configurations of the AntBoxes, the transformer, the switchgear, and the panelboards, and relative locations among the AntBoxes, the transformer, the switchgear, and the panelboards.

Another aspect of the present disclosure provides a cryptocurrency mining method. The method includes: establishing a cryptocurrency system that includes a plurality of mining modules. Each mining module includes: a plurality of AntBoxes, a transformer, and a switchgear and panelboards that connect the AntBoxes with the transformer, each AntBox being a computational unit that houses a plurality of miners. The plurality of mining modules has substantially same structure arrangement. The structure arrangement includes: configurations of the AntBoxes, the transformer, the switchgear, and the panelboards, and relative locations among the AntBoxes, the transformer, the switchgear, and the panelboards. The method also includes when a mining module is controlled to turn on, converting, by the transformer of the mining module, an input voltage to a working voltage to supply electric power to the plurality of AntBoxes in the mining module through the switchgear and panelboards; and performing, by the miners housed in the plurality of AntBoxes in the first mining module, cryptocurrency farming.

One aspect of the present disclosure provides a cryptocurrency mining method. The method includes: obtaining electricity price information and cryptocurrency price information; determining operation control parameters of the cryptocurrency mining system according to the electricity price information and the cryptocurrency price information; and controlling an operation of a target group of cryptocurrency miners according to the operation control parameters. The operation includes switching between operation states, and the operation states includes at least a running state and an off state.

Another aspect of the present disclosure provides a cryptocurrency mining controller device applied to a cryptocurrency mining system that includes a plurality of cryptocurrency miners. The controller device includes one or more memories and one or more processors. The one or more processors are configured to perform: obtaining electricity price information and cryptocurrency price information; determining operation control parameters of the cryptocurrency mining system according to the electricity price information and the cryptocurrency price information; and controlling an operation of a target group of cryptocurrency miners according to the operation control parameters. The operation includes switching between operation states, and the operation states includes at least a running state and an off state.

Other aspects of the present disclosure can be understood by those skilled in the art in light of the description, the claims, and the drawings of the present disclosure.

BRIEF DESCRIPTION OF THE DRAWINGS

In order to more clearly illustrate the technical solutions in the embodiments of the present disclosure, the drawings used in the description of the embodiments will be briefly described below. It is obvious that the drawings in the following description are only some embodiments of the present disclosure. Other drawings may be obtained by those of ordinary skill in the art based on these drawings.

DETAILED DESCRIPTION

The technical solutions according to the embodiments of the present disclosure described in the following with reference to the accompanying drawings. The described embodiments are only part of the embodiments of the present disclosure, but not all the embodiments. All other embodiments obtained by a person of ordinary skill in the art based on the embodiments of the present disclosure without creative efforts are within the scope of the present disclosure.

The present disclosure includes embodiments of architectural and operational design of a cryptocurrency mining facility in a cost-effective and energy efficient manner. The cryptocurrency mining facility may also be referred as a cryptocurrency mining center, a cryptocurrency mining farm, a cryptocurrency mining system, a mining center, a mining farm, or a mining system.

Existing mining center designs are typically based on a specific total power demand. Each new mining data center requests a new design and a selection of new bill of material because of the new design. The present disclosure provides a modular design of the mining facility which can be conveniently scaled up or scaled down.

Figure 1:
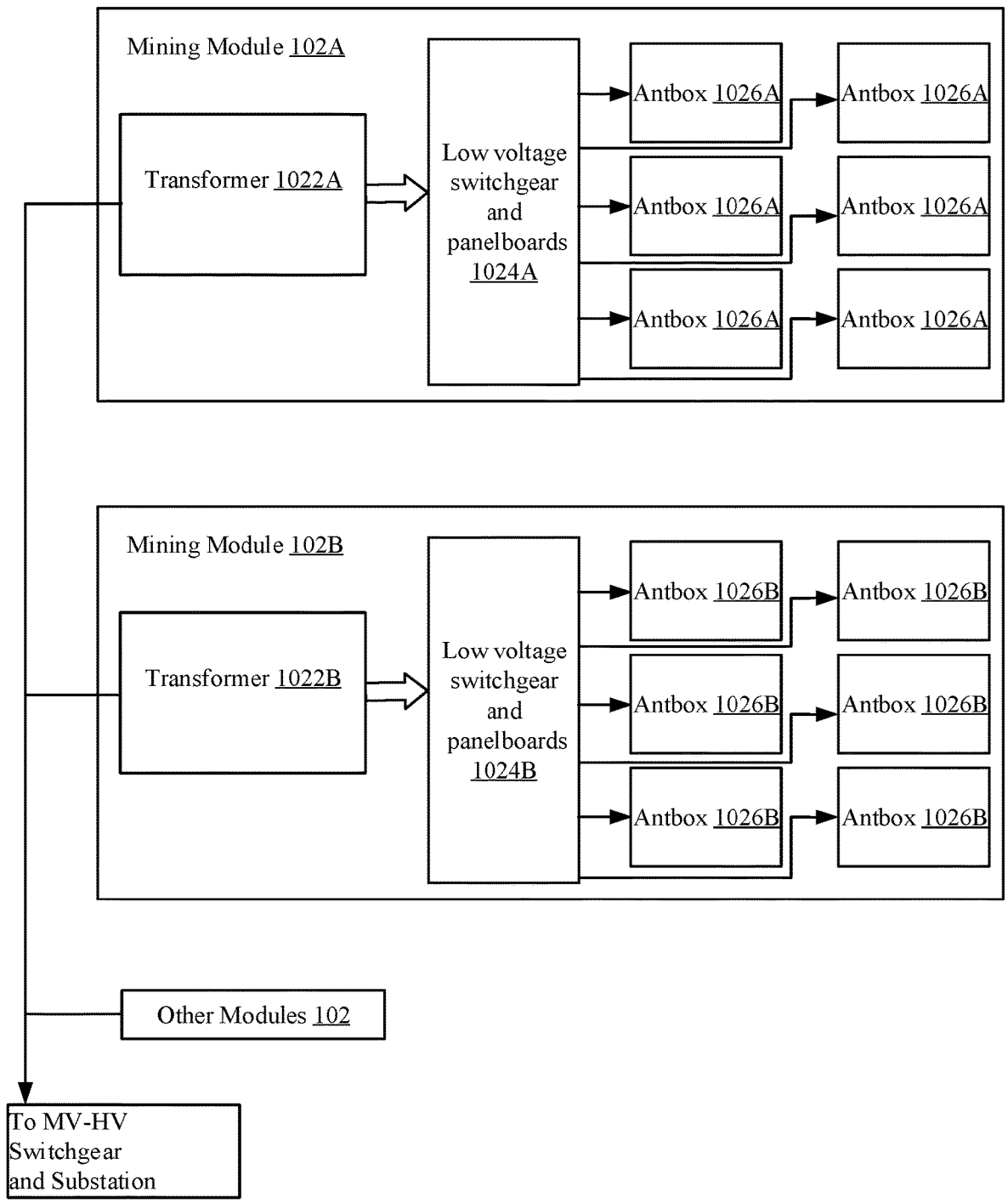
FIG. 1 shows a configuration of a modular cryptocurrency mining center according to certain embodiments.

FIG. 1 shows a configuration of a modular cryptocurrency mining center according to certain embodiments. As shown in FIG. 1, the mining farm may include a plurality of identical or very similar mining modules 102, such as module 102A, module 102B, etc. The plurality of mining modules 102 may be connected to one or more medium voltage-high voltage (MV-HV) switchgear and substation. The MV-HV switchgear and substation is configured to convert high voltage from electrical grid to a medium voltage (e.g., 100 kV). In one example, a MV-HV switchgear may be provide power to 6 mining modules for isolation and protection.

The present disclosure does not limit the number of modules in the mining farm. The mining modules 102 may be isolated from each other. That is, the mining modules 102 may be set apart at different locations on the mining farm, instead of placing miners inside a same building for being racked and connected to a transformer outside in existing mining farm design.

Each module 102 may include a transformer 1022, low voltage (LV) switchgear and panelboards 1024, and a plurality of AntBoxes 1026. The cables connecting from the transformer to the LV switchgear and panelboards are held in a same cable holder specific structure (e.g., an underground trough, a cable tray on the ground) to save the length of cables. In certain embodiments, the transformer 1022 may connect to one LV switchgear, and the LV switchgear may then connect to multiple panelboards (also referred as panel box, or control panel). In certain embodiments, the transformer in each module may be graded for 2500~3000 KVa. In certain embodiments, the transformer may convert a high input voltage (e. g., a 13.2 KV voltage) to a working voltage (e. g., a 415Y/240V voltage) to supply electric power to the AntBoxes, through the LV switchgear and the panelboards. The present disclosure does not limit the input and output voltages of the transformer. In certain embodiments, each module may include 6 AntBoxes 1026. Each AntBox 1026 is a computational unit that houses computing hardware for cryptocurrency farming. In one example, an AntBox may include 180-190 cryptocurrency miners. After being connected to electrical power source and networks, the AntBox may start cryptocurrency mining right away. The AntBox 1026 may use a standard container construction, and it may be portable and easy to transport. The cable connection between the panelboards and the AntBoxes in each mining module may adopt a substantially same configuration.

The mining modules at the mining center may have substantially same structure arrangement. The structure arrangement includes, for example, configurations of the components of the mining module, the components including the AntBoxes, the transformer, the switchgear, and the panelboards. The configuration of the components of the mining module may include one or more of: quantity, size, rating, or any other proper hardware specification of these components. The structure arrangement may further include relative locations among the components, such as distance, relative orientation/direction, etc. The structure arrangement may further include arrangement of cable holders and power cables for connecting the components. For example, cable lengths used in each mining module may be substantially the same (e.g., 2% variation).

The plurality of AntBoxes 1026 in each mining module 102 may be laid out in a single tier, or they may be stacked to multiple tiers. That is, the plurality of AntBoxes is arranged in one or more tiers, each tier includes multiple AntBoxes placed side by side. When the plurality of AntBoxes is arranged in multiple tiers, the multiple tiers may be stacked on top of one another. In one embodiment, for example, in each module, 6 AntBoxes may be placed side by side. In another embodiment, in each module, the 6 AntBoxes may be placed in a two-tier layout, with 3 AntBoxes placed side-by-side on a bottom tier and the other 3 AntBoxes stacked on top of the bottom tier to form a second tier. Each panelboard may correspond to one AntBox. The panelboards corresponding to the AntBoxes at the same tier may be placed together (e.g., placing 3 panelboards corresponding to the AntBoxes at top tier on the left of the LV switchgear and placing 3 panelboards corresponding to the AntBoxes at bottom tier on the right of the LV switch gear). Cables connecting from the panelboards to the AntBoxes at top tier may be collected and held in a same cable holder structure to save length, and cables connecting from the panelboards to the AntBoxes at the bottom tier may be collected and held in another same cable holder structure to save length. The cable holder structure may include one or more of horizontal holder, vertical supporter, cable rack in the air held by the vertical supporter, etc.

In one example, an AntBox may have a length of 4 meters and a height of 3 meters. A mining module may include 6 AntBoxes each having a power consumption of 0.4 Megawatts, or 4 AntBoxes each having a power consumption of 0.5 Megawatts. One AntBox may house same type of miners. Different AntBoxes may house same or different types of miners. The present disclosure does not limit the number and layout of the AntBoxes in each module.

In addition to the power line connection at the mining farm shown in FIG. 1, the mining farm further includes a miner control system (also referred as a miner control unit, a controller or a controller device) configured to control operation states of cryptocurrency miners in units of the mining modules (i.e., at the mining module level). That is, the operation state of a miner is controlled according to a mining module that the miner belongs. Specifically, a communication module in each miner is configured to establish a connection with the miner control system. For example, each miner has a unique identifier (e.g., a serial number, an address, etc.) indicating which mining module and/or AntBox that the miner belongs. The communication module is configured to send operation information (e.g., operation states, temperature readings) and mining information (e.g., mined cryptocurrency) to the controller, and receive control information about operation state adjustments from the controller. The unique identifier may be always included in the information sent and received between each miner and the controller. One example of controlling the operation states of miners in units of mining modules include: controlling the miners in a same mining module to adjust their operation states in a same manner at the same time. Another example of controlling the operation states of miners in units of mining modules includes: controlling a same number of miners in multiple mining modules to adjust their operation states in a same manner, such as switching operation states of miner 0 to miner 100 in the first AntBox of each mining module of modules 1-3, or switching operation states of miner 101 to miner 150 in all AntBoxes of each mining module of modules 4-5. This may introduce less impact to the power system at the mining center. The operation states may be determined at least one of cryptocurrency farming/mining information, power consumption information, or electricity price information. For example, the controller may determine to turn on additional 500 miners. The 500 miners may be in the same mining module, or 100 miners in 5 mining modules. Specific implementations of controlling operation states are further described in embodiments with reference to FIGS. 5-8.

The modular design in the present disclosure provides a simplified approach to scale up by adding additional modules to the mining facility. Since the additional modules have the same set of bill of material (BOM) and construction, scaling up is also cost-effective. The system is also easy to modify or upgrade. Further, since each module is isolated from other modules, module-based configuration change may have minimum impact on operation. In addition, in malfunction or maintenance scenarios, it is easy to identity a target module, and the troubleshooting and maintenance work can be performed by taking the advantage of the modular design (e.g., turning on/off a specific mining module and/or an AntBox using the corresponding switchgear and/or panelboard).

Figure 2:
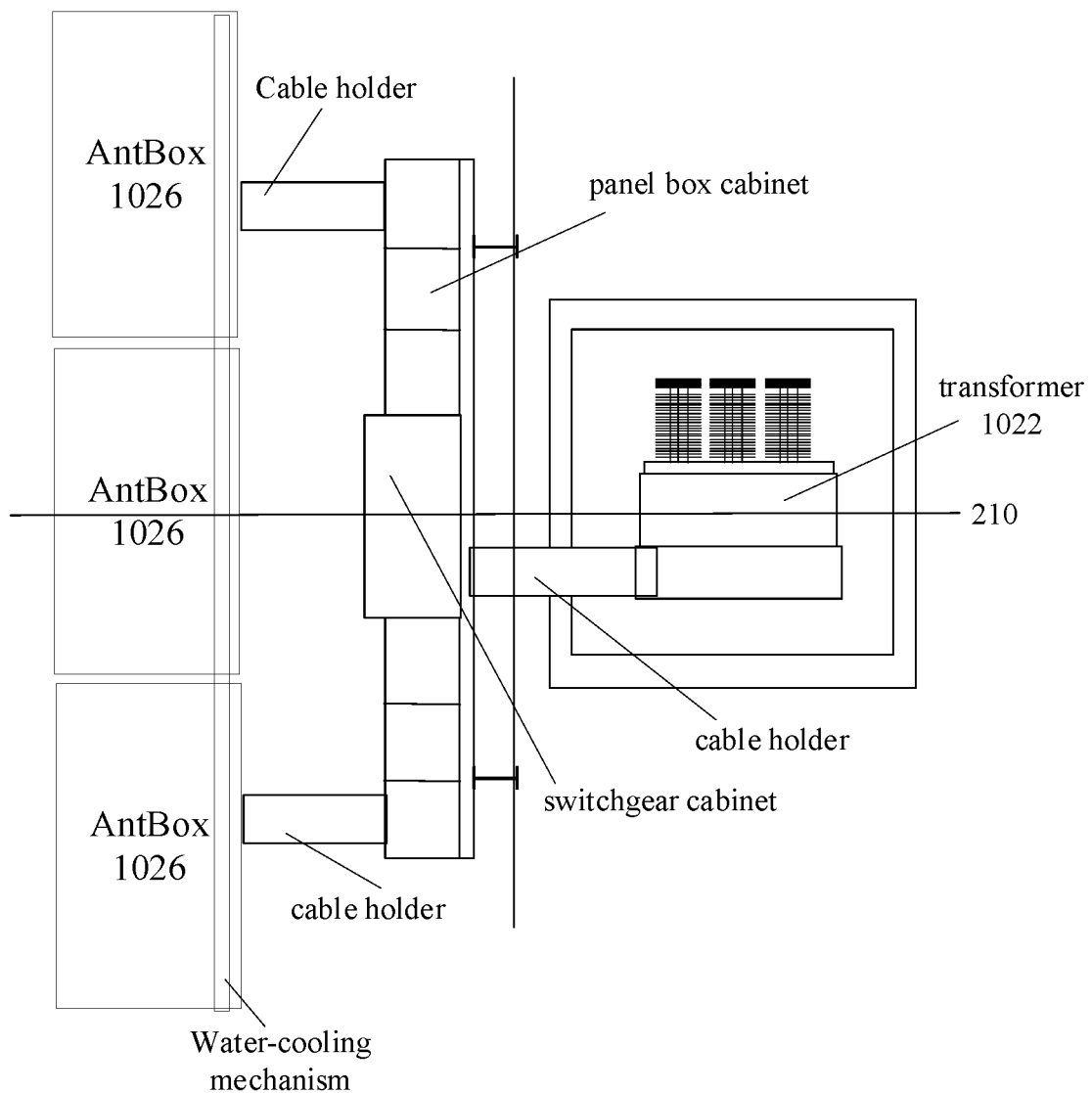
FIG. 2 shows a configuration of a cryptocurrency mining module according to certain embodiments.

FIG. 2 shows a top view of a cryptocurrency mining module according to certain embodiments. As shown FIG. 2, in each cryptocurrency mining module, switchgear and control panels may be placed in respective cabinets. A transformer may be located close to switchgear and panel box cabinets on one side. A plurality of AntBoxes may be placed next to the other side of the switchgear and panel box cabinets. The relative positions of the transformer, switchgear and panelboard cabinets, and the AntBoxes may be configured to minimize connection cable length and optimize space utilization. As shown in FIG. 2, a center of the transformer, a center of the structure holding the switchgears and panel boxes, and a center of the laid-out AntBoxes are on the same line, so as to minimize cable length. The specific layouts may be configured according to the specific parameter space and are not limited in the present disclosure. Electrical cables connecting the output of the transformer and the switchgear and panel boxes may be contained in a cable tray. Some electrical cables may connect the AntBoxes to electrical power sources. In some embodiments, some other electrical cables may connect the miners in the AntBoxes to the networks.

In one embodiment, as shown in FIG. 2, a switchgear cabinet may be configured at a center location with half of the panel boxes placed at two sides of the center location. On a left side of the switchgear cabinet, three panel box cabinets may be placed next to each other. Similarly, on a right side of the switchgear cabinet, another three panel box cabinets may be placed side by side. Thus, a total of six panel box cabinets are placed next to the switchgear cabinet. Each panel box cabinet may house control panels for one of the AntBoxes. As shown in FIG. 2, a center of the transformer, a center of the switchgear cabinet, and a center of the AntBoxes are aligned on a same line 210. The design and positioning layout of the switchgear and panel box cabinets may be configured according to the specific application scenario and are not limited in this disclosure.

In certain embodiments, the transformer may be placed on a concrete platform. The cable tray that contains the electrical power cables connecting the output of the transformer to the switchgear and panel boxes may be a rigid structure containing vertical portions that suspend a portion of the cables on top of the transformer and the switchgear and panel boxes. Thus, the electrical power cables are spatially isolated from other structures of the module. Part of the cables respectively connecting three panel boards to three AntBoxes arranged in top tier may share a common cable holder from the ground to a higher rack; part of the cables respectively connecting three panel boards to three AntBoxes arranged in bottom tier may share another common cable holder from the ground to a lower rack. In certain other embodiments, a portion of the cable tray may be buried beneath the transformer and the switchgear and panel boxes. The plurality of AntBoxes may be placed behind switchgear and panel box cabinets. The relative positions of the transformer, switchgear and panel box cabinets, and the AntBoxes may be configured to minimize connection cable length and optimize space utilization. The specific layouts may be configured according to the specific parameter space and are not limited in the present disclosure.

In certain embodiments, the cryptocurrency mining system may also include a water-cooling mechanism, which includes one or more water storage tanks configured to store cooling water, water supply pipes configured to deliver the cooling water from the one or more water storage tanks to one or more of the mining modules, a water supply control valve placed in each mining module configured to control a water flow of the cooling water in the mining module, and a water collection reservoir placed in each mining module configured to collect remaining water after the cooling water is dissipated to the AntBoxes. The remaining water being recycled and transported to the one or more water storage tank.

Figure 3:
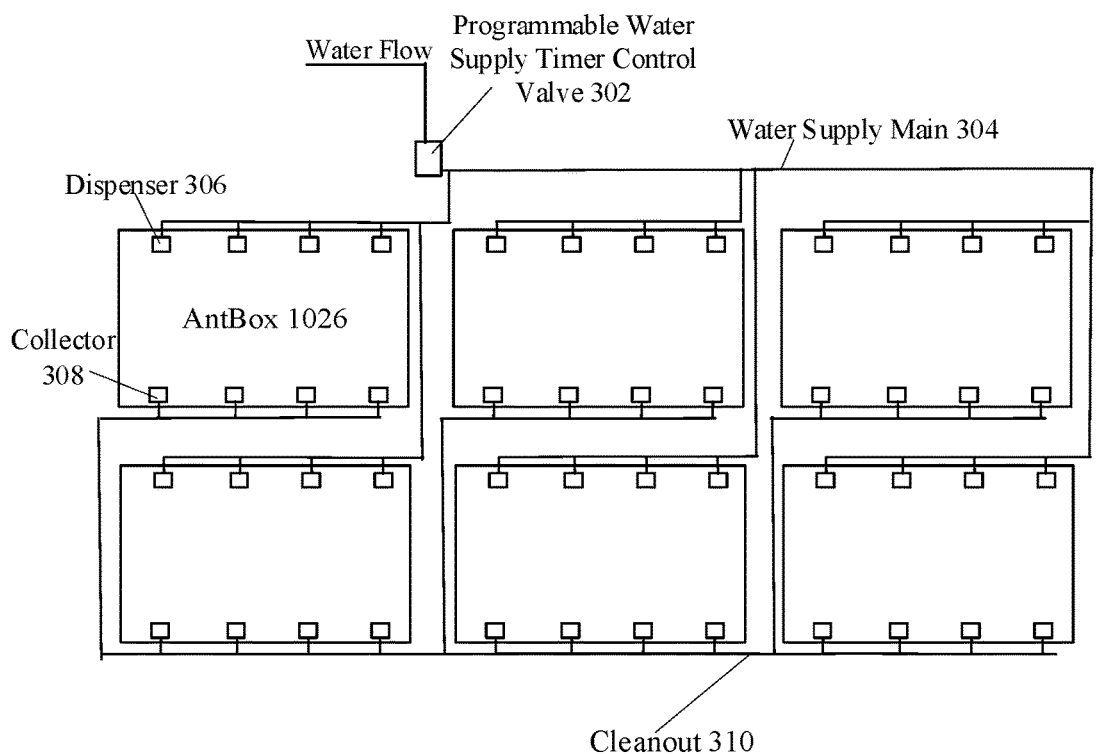
FIG. 3 shows a configuration of a water-cooling mechanism for a cryptocurrency mining module according to certain embodiments.

FIG. 3 shows a configuration of a water-cooling mechanism for a cryptocurrency mining module according to certain embodiments. In one embodiment, the water-cooling mechanism for a mining module may include a first water reservoir 304 for delivering cooling water and a second water reservoir 310 for collecting recycled water. A plurality of water pipes may deliver cooling water to the transformer, the switchgear and panel boxes, and the AntBoxes. In certain embodiments, the water-cooling mechanism may further include a water storage tank placed on top of the plurality of AntBoxes. The water storage tank may store cooling water configured to be delivered to the AntBoxes via water pipes and control valves. In certain other embodiments, the water storage tank may be located on the ground. Alternatively, the water storage tank may not be mining module specific, and may be associated with a pump at a close location and configured to provide cooling water for multiple mining modules.

As shown in FIG. 3, six AntBoxes may be stacked in a two-tier configuration, each tier having three AntBoxes. Water lines may deliver cooling water to the AntBoxes for heat dissipation. One side of an AntBox which cooling fans of miners are facing may be covered with a water-cooling pad (e.g., a curtain made of folded craft paper from top to bottom). The water-cooling pad may be configured on the side of the AntBox facing the panelboard and switchgear (e.g., as shown in FIG. 2). The cooling water may be dispensed from the top of the AntBox (e.g., the pipe from water supply main 304 and through the dispensers 306 as shown in FIG. 3) to run through the cooling pad/curtain. As the fans of the miners housed in the AntBox are spinning, the air from the curtain is cooled and heat from the miners is dissipated. A cleanout 310 at the bottom of the AntBoxes (i.e., the second water reservoir) may collect remaining water which is not being dissipated through collectors 308. The water pipes may transport the remaining water to the water storage tank for recycled use.

In existing water-cooling mechanism, water flow rate through the water-cooling pad may be typically controlled by a circulation pump, which usually is set a constant speed. A variation speed pump may be costly and economically not viable in many applications. At a constant pump speed, water flow rate may be too high for water cooling pad evaporation. As a result, most water may flow back to the storage tank, resulting in energy waste due to unnecessary water circulation.

According to certain embodiments of the present application, the water supply control valve may be programmable and control output of cooling water from the water supply and storage tank. The control valve may control on, off, and flow speed of the cooling water. A control valve controlling flow of cooling water may be operated by a programmable control system. The programmable control system may operate the control valve to turn on, off, or change flow speed of the cooling water according to certain operational parameters.

In one example, a top water storage tank is configured on the top of the mining AntBoxes with a supply pipe system connected to a water source. A water supply control valve may be configured at a bottom portion of the water storage tank. The control valve may be operated by a control system. A ground water drainage storage tank with a rainwater catch system and a pump circulation system may be configured to supply water to the top water storage tank. With the top water storage tank, water flow rate may be easily controlled by the valve system to provide optimum water flow rate to the water-cooling pads and generate better water evaporation rate and cooling efficiency.

Figure 4:
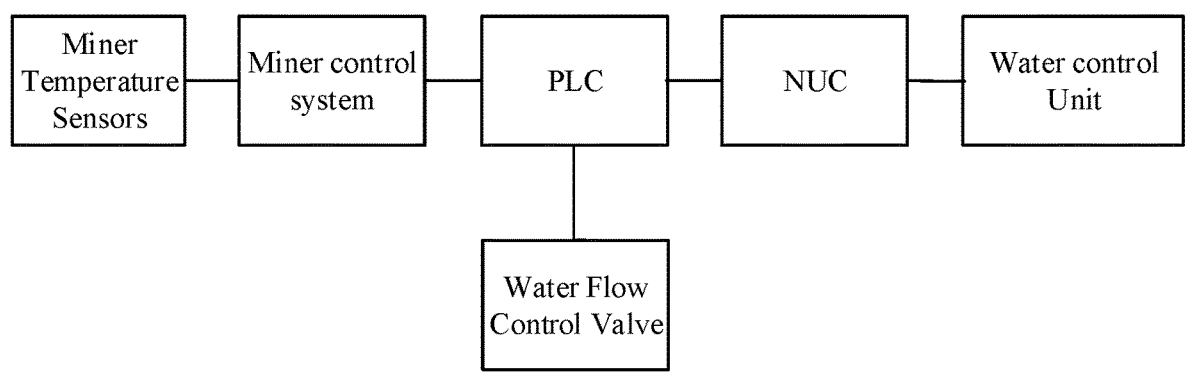
FIG. 4 shows a framework of a water-cooling control mechanism for a cryptocurrency mining module according to certain embodiments.

FIG. 4 illustrate a control system of the flow of the cooling water. As shown in FIG. 4, the water control system may determine a water control program indicating control parameters for one or more water flow control valves in corresponding mining module(s), send the control parameters to a next unit of computing (NUC) which are then converted to signals for a programmable logic control (PLC) unit. The PLC may control the operations of water flow control valves corresponding multiple mining modules according to the signals from NUC.

The water control program may specify, for example, time periods to turn on or off of each water flow control valve of mining modules in operation. The water control program may further specify the flow rate or the flow volume for each mining module. In certain embodiments, the water flow in operating mining modules may be sequentially turned on and off for a specific time period. For example, water flow of the first mining module may be turned on for two minutes from minute 0 to minute 1, water flow of the second mining module may be turned on next also for two minutes from minute 2 to minute 3, . . . water flow of the ith mining module may be turned on for two minutes from minute $i*2-2$ to minute $i*2-1$. When all n modules are traversed, the water flow goes back to the first mining module and is turned on for two minutes from minute $n*2$ to minute $n*2+1$. In one application scenario, it may take about 2 minutes to completely wet the water-cooling pad/curtain in a mining module, and after the cooling pad is completely wet, additional cooling water running through the same mining module may not increase heat dissipation and just be directly recycled. Water evaporation of the cooling pad may last about 20 minutes, so there is capacity to deliver the cooling water to 9-10 mining modules when their water control valves are controlled to be turned on and off sequentially. In this way, volume requirement for cooling water storage is low without compromising the cooling effect and heat dissipation at the mining modules.

As shown in FIG. 4, a plurality of temperature sensors may measure temperature at different positions of the mining computers. Each miner may include multiple temperature sensors. The measured temperatures may be transmitted to a miner control system for processing and the processed temperature information may be inputted to a programmable logic control (PLC) unit which then interpreted by a next unit of computing (NUC) and sent to the water control unit. The processing of measured temperatures of the miners performed by the miner control system may include determining an average temperature for miners at the same location (e.g., at the same rack in the AntBox, at the same AntBox, or at the same mining module). In certain embodiments, the water control program may include a proprietary program that calculates optimal valve control parameters according to the measured temperature. The output of the control program may be used to operate the water flow control valve to control the flow of the cooling water, thereby keeping the miners working at an operation temperature range. For example, when the temperature information indicates that a difference between the average temperature at a first AntBox and a maximum operation temperature is smaller than a first preset threshold, the control program may control the water control valve at the first AntBox to increase a water flow rate; and when the temperature information indicates that the average temperature at the first AntBox is within the operation temperature range and the difference between the average temperature at the first AntBox and the maximum operation temperature is greater than a second preset threshold, the control program may control the water control valve at the first AntBox to decrease the water flow rate.

The water control unit (e.g., through the PLC and NUC) can individually control an operation of the water supply control valve in each mining module, the operation including turning the water supply control valve on and off to control whether the cooling water is delivered into the corresponding mining module. The operation further includes adjust a water flow rate of the cooling water being delivered to the corresponding mining module.

In some embodiments, the water control unit of the mining farm/center is further configured to: obtain temperature information associated with data recorded by temperature sensors in the cryptocurrency miners; and individually control the operation of the water supply control valve in each mining module according to the temperature information. For example, when the temperature information indicates temperature at one mining module is higher than a temperature threshold, the water control unit may determine to increase a flow rate of the cooling water at that mining module. In some embodiments, the water control unit of the mining farm/center is further configured to individually control the operation of the water supply control valve in each mining module according to at least one of: an environment temperature or the on/off status of the corresponding mining module. In one example, when the environment temperature drops, the water control unit may determine to lower the flow rate of cooling water. The flow rate of cooling water may have a positive correlation with the environment temperature. In another example, when the miner control unit determines to turn on miners in a mining module, the water control unit may further determine to turn on the water supply control valve. The on/off status may also be operation states of the mining module. For example, when the miner control unit determines to switch miners in a mining module from turbo operation state to an energy-saving state, the water control unit may further determine to control the water supply control valve for a lower flow rate of cooling water in the mining module.

According to certain embodiments, the mining farm and the water-cooling system are weather-proof and may operate in an outdoor environment. In certain other embodiments, the mining farm and the water-cooling system may operate in an indoor environment.

The present disclosure further provides a control system and method for controlling mining operations of the cryptocurrency mining farm. The control system may consider factors such as electricity price, electricity load, cryptocurrency price, and cryptocurrency mining competition, to control operation the cryptocurrency miners. For example, the control system may turn on, turn off, or change operation modes of the mining computations.

Figure 5:
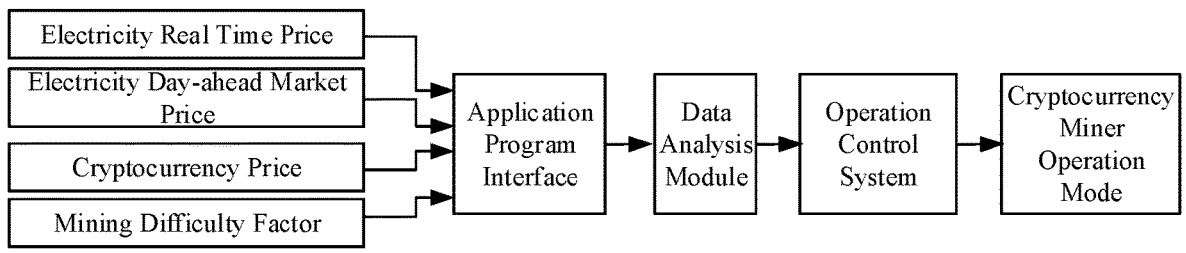
FIG. 5 shows a configuration of cryptocurrency mining framework for a cryptocurrency mining center according to certain embodiments.
Figure 6:
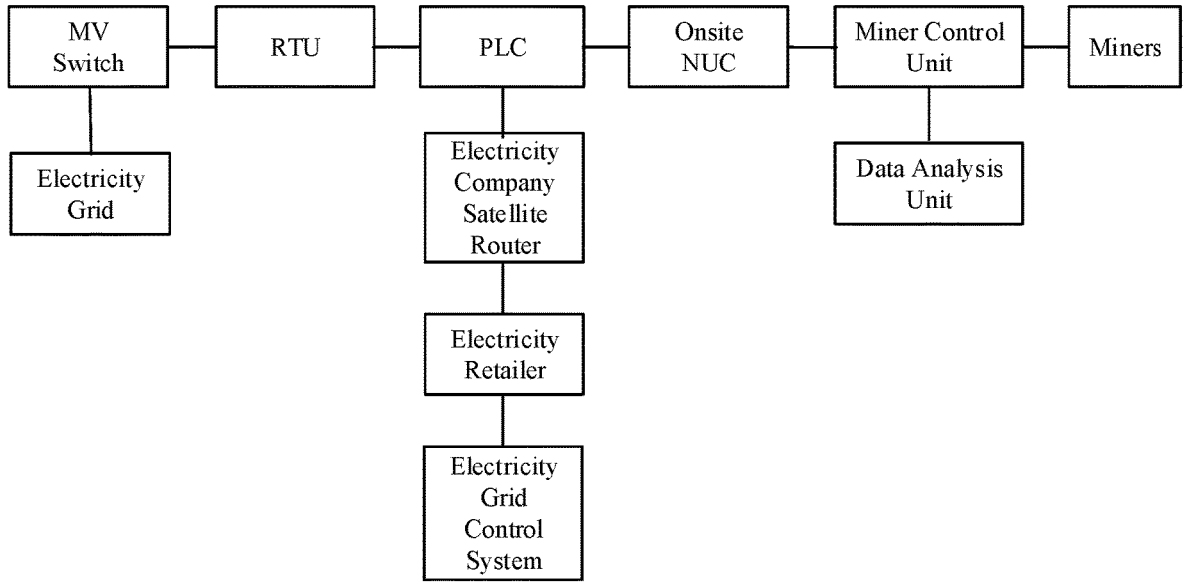
FIG. 6 is a structural diagram illustrating exemplary hardware components of a cryptocurrency mining system according to certain embodiments.

FIG. 5 shows a configuration of cryptocurrency mining framework for a cryptocurrency mining center according to certain embodiments. FIG. 6 is a structural diagram illustrating exemplary hardware components of a cryptocurrency mining system according to certain embodiments.

As shown in FIG. 5 and FIG. 6, in certain embodiments, the control system may collect information such as electricity real-time price, electricity day-ahead market price, cryptocurrency price. In certain embodiments, the information may be automatically collected through a network to an application program interface. The application program interface may convert the received information to a format readable by a data analysis module. The data analysis module may analyze collected input parameters to generate operation control parameters. An operation control module may use the operation control parameters to control operation of the cryptocurrency miners. For example, in certain embodiments, the control system may turn on, turn off, or change operation modes of the miners. In certain embodiments, the operation modes may include a turbo mode for high-speed computing, an energy-saving mode of maximum energy efficiency, and one or more operations modes in between.

As shown in FIG. 6, the mining system may be connected to the electricity grid through a power switch (e.g., medium voltage switch). The mining system may include a remote terminal unit (RTU), a programmable logic controller (PLC), a next unit of computer (NUC), a miner control unit, a data analysis unit, and miner firmware to control the operation of the miners. The RTU may be connected to the power switch and configured to record power consumption and facilitate remote control such as remotely turning on or off the power switch and reporting the recorded power consumption to a remote terminal. The PLC may be configured to obtain the amount of power consumption (e.g., from the RTU) and electricity price information (e.g., from the electricity company satellite router provided by electricity retailer). The NUC is placed on site and configured to monitor the amount of power consumption received from the PLC and send control signals to the miner control unit according to the monitored status. For example, the NUC may detect that the power consumption at the mining center is less than a certain amount and inform the miner control unit to increase power consumption; and detect that the power consumption at the mining center is greater than another certain amount and inform the miner control unit to lower power consumption. One NUC may correspond to one PLC. It can be understood that the NUC and PLC shown in FIG. 6 for controlling operation states of miners are different from the NUC and PLC shown in FIG. 4 for controlling operations of water valves.

The miner control unit may be connected to the miners and configured to execute a controller-side proprietary control program for controlling operation states of the miners. The miners may also be installed with a terminal-side proprietary control program to recognize and execute commands generated by the controller-side proprietary control program from the miner control unit. The data analysis unit may be connected to the miner control unit and configured to execute a proprietary cost analysis program which is designed determine a cost-effective solution for the mining center based on the power consumption and the electricity price information, the cryptocurrency price information, and/or the mining difficulty factor.

Figure 7:
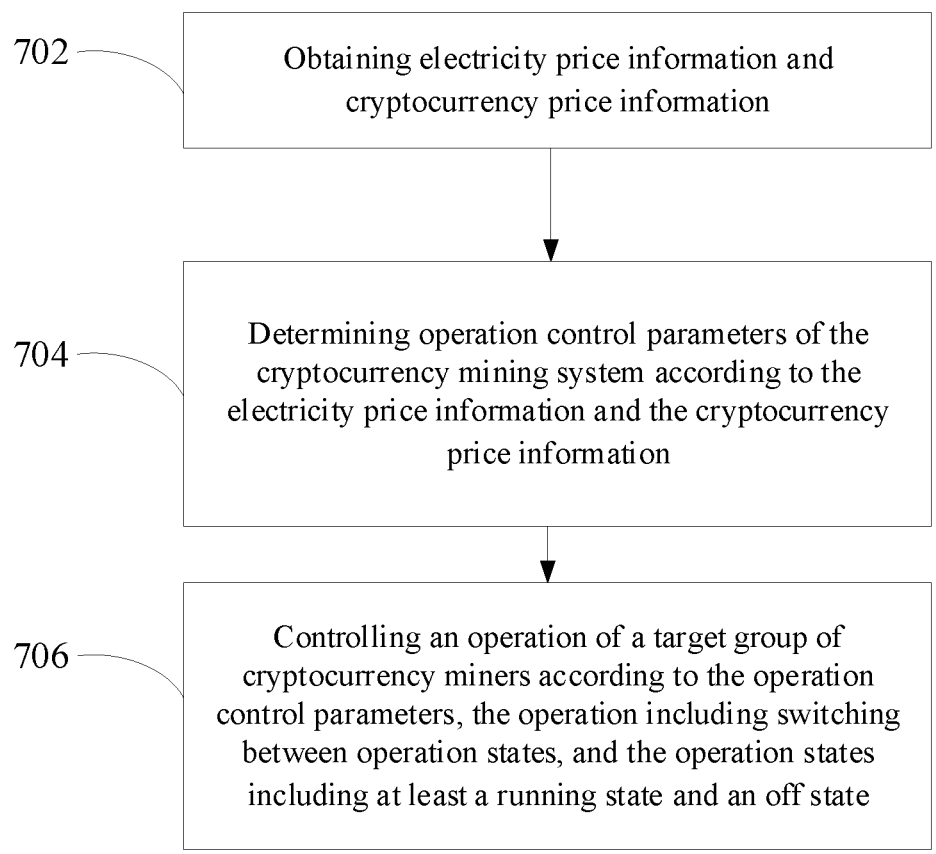
FIG. 7 shows a flow chart of a cryptocurrency mining method according to certain embodiments.
Figure 8:
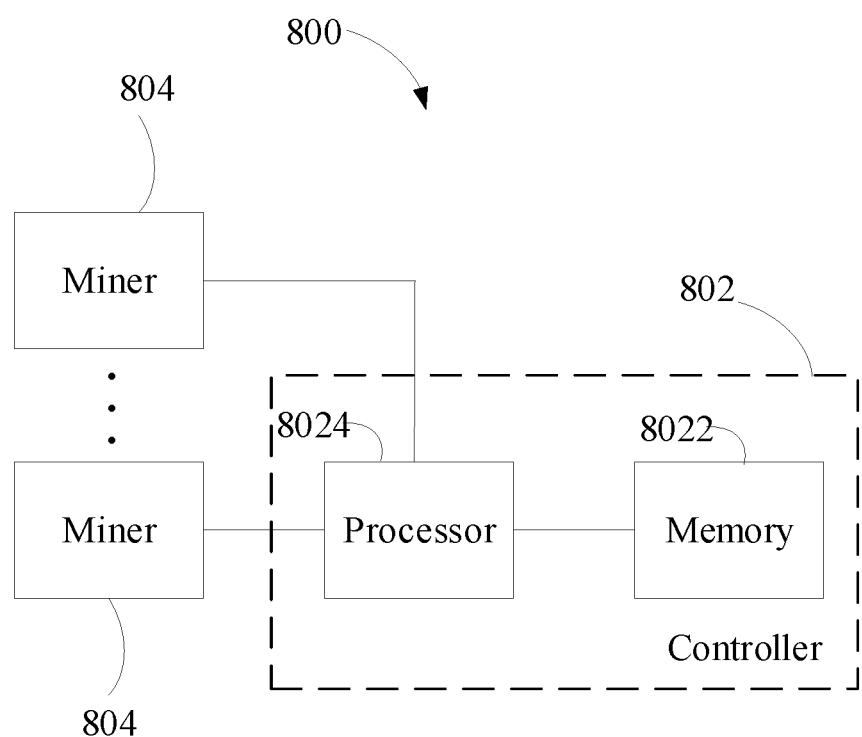
FIG. 8 shows a structural diagram of a cryptocurrency mining system according to certain embodiments.

FIG. 7 shows a flow chart of a cryptocurrency mining method according to certain embodiments. FIG. 8 shows a structural diagram of a cryptocurrency mining system according to certain embodiments. The method disclosed in accordance with FIG. 7 may be implemented by the mining system shown in FIG. 8. The disclosed method may also be implemented on the framework shown in FIG. 5 and by the cryptocurrency mining system shown in FIG. 6. The mining system shown in FIG. 6 may be considered as a specific configuration of the mining system shown in FIG. 8.

As shown in FIG. 8, the cryptocurrency mining system 800 includes a controller 802 and a plurality of cryptocurrency miners 804. The controller includes one or more processors 8022 and one or more memories 8024. The one or more memories 8022 store program instructions executable by the one or more processors 8024. The one or more processors 8022 are configured to execute the program instructions to implement a cryptocurrency mining method in accordance with various embodiments in the present disclosure. In some embodiments, the controller 802 may include and/or implement the PLC, NUC, and/or the miner control unit/system as shown in FIG. 4 and FIG. 6. In some embodiments, the controller 802 may include and/or implement the PLC, NUC, and/or the water control unit as shown in FIG. 4. In some embodiments, the controller may include and/or implement the application program interface, the data analysis module, and/or the operation control system as shown in FIG. 5. A cryptocurrency miner 804 may include computing components such as power supply unit, processor, memory and graphic cards for mining a cryptocurrency, and a cooling mechanism such as one or more fans. In some embodiments, the miner may further include a temperature sensor.

The cryptocurrency mining system may or may not adopt the modular design as previously discussed with reference to FIG. 1 as long as the controller is enabled to selectively adjust operation modes of the cryptocurrency miners in the cryptocurrency mining system.

Returning to FIG. 7, in an exemplary embodiment, the disclosed cryptocurrency mining method includes obtaining electricity price information and cryptocurrency price information (S702). Said information may be obtained through the application program interface. The electricity price information may include electricity real-time price. In some embodiments, the electricity price information may further include electricity prediction price, credit program information, and/or electricity lock-in price. In some embodiments, some or all of the electricity price information may be imported to the controller based on a user input (e.g., through manual entry, analyzing price information in a text message and/or an email, importing a price data file, etc.). In some embodiments, some or all of the electricity price information may be automatically obtained through network communication with a server of an electricity provider. For example, the electricity provider may provide a router that is in connection with the server of the electricity provider and that is configured to receive electricity price information from the server of the electricity provider. The controller may establish, e.g., through the PLC, a communication channel with the router and obtain the electricity price information from the router. The router may be a satellite router provided by an electricity retailer. The server of the electricity provider may be a server of the electricity grid control system and/or the electricity retailer. For example, the electricity provider may be Electric Reliability Council of Texas (ERCOT), or any other suitable electricity power provider or electricity grid.

The electricity price may fluctuate from time to time, such as at different hours during a day, at different days during a week, at different season during a year, and at different years. The electricity retailer may specify the electricity real-time price corresponding to a current time period. The real-time price may be refreshed at certain intervals, such as 5 minutes. The electricity consumed during the current time period is charged at the real-time price. In one embodiment, the real-time price may increase when the amount of total power consumption of consumers (e.g., factories, residential houses, hospitals, etc.) in the area is high and decrease when the power consumption is low.

The electricity prediction price may refer to an estimated electricity market price corresponding to a future time. The electricity prediction price may include, for example, an electricity day-ahead market price that provides a predicted market price for the next day. The electricity prediction price may provide a reference in determining participation in a credit program for a future time and/or whether to buy certain amount of electricity in advance.

The credit program information may include credit/rebate that the electricity retailer provides corresponding to a future time period, which requires advance commitment of the consumer, the consumer being the cryptocurrency mining system/center here. The advance commitment may need to be registered with the electricity retailer before a due time. For example, the credit program may specify a credit value for each unit of electricity (e.g., each KWh) consumed corresponding to a specific day in the future, and the consumer is required to register, that is, inform the electricity retailer, 24 hours before that specific day to confirm the advance commitment, i.e., to participate in the credit program. The advance commitment may further include a committed amount of power consumption. Once the advance commitment is confirmed, the consumer would be credited for the committed amount of power consumption during the future time period according to the credit value. For example, the total cost for the committed amount of power consumption during the future time period equals subtracting a product of the credit value per unit and the committed amount from cost of consuming the committed amount of power according to the real-time price. Participant of the credit program is also agreed to reduce power consumption for an amount equal to or less than the committed amount upon receiving a notification from the electricity retailer (e.g., so that the reduced amount of electricity can be diverted to another consumer in urgent need, such as a hospital, or willing to pay a higher electricity price than the real-time price). Consuming power less than the committed amount in the future time period may be charged at a price higher than the real-time price and/or cause a penalty charge. Additional amount of power consumption over committed amount during the future time period may be charged at the electricity real-time price without receiving the credit value. For example, the advance commitment may specify that the committed amount of power consumption is 20 Megawatt hours (MWh) on the coming Wednesday for a credit value of 2 cents per kWh, and the total amount of power consumption of the cryptocurrency mining center at full capacity is 50 MWh. Accordingly, assuming the cryptocurrency mining center consumes 30 MWh in a first time period on that Wednesday, the cost of electricity at the mining center in the first time period equals subtracting 0.02*20*1000 from the cost of consuming 30 MWh at the electricity real-time price. Further, if the mining center is consuming 30 MWh when being informed to reduce power consumption for 20 MWh in a second time period, the cost of electricity at the mining center in the second time period is the cost of consuming 10 MWh at the electricity real-time price.

The electricity lock-in price may refer to a price offered by an electricity retailer for purchasing electricity corresponding to a time period in advance. The payment is made ahead of the usage time at the offered lock-in price. That is, the cost is fixed for the purchased amount of electricity at the corresponding future time regardless of the actual power consumption as long as the consumed amount is less than the purchased amount.

The electricity price information may further include historical electricity prices. In some embodiments, the historical electricity prices may be obtained by recording a current electricity price information (e.g., electricity real-time price, electricity lock-in price) and its corresponding time period each time a new electricity price information is received to replace the current electricity price information. In some embodiments, the historical electricity prices may be imported from a data file (e.g., obtained from the electricity provider/retailer or other sources).

The cryptocurrency price information may include historical and current prices of one or more types of cryptocurrencies being mined at the cryptocurrency mining center. Operation of a miner may be affected by the price of a specific type of cryptocurrency that the miner is currently mining. In some embodiments, some or all of the cryptocurrency price information may be obtained online from the corresponding cryptocurrency network and/or website. In some embodiments, some or all of the cryptocurrency price information may be obtained based on a user input such as manual entry, data file importing, etc.

In some embodiments, mining difficulty information may also be obtained. The mining difficulty information may include a mining difficulty factor for each type of cryptocurrency being mined at the mining center. The mining difficulty factor may be obtained from the network of the corresponding type of cryptocurrency. The mining difficulty factor may generally increase when there are more miners in the mining pool of the corresponding type of cryptocurrency and decrease when there are less miners.

Further, operation control parameters of the cryptocurrency mining system may be determined according to the electricity price information and the cryptocurrency price information (S704).

A cryptocurrency mining system relies heavily on electricity and the profit of running all the miners may not justify the cost from the electricity bill, especially at peak times. Accordingly, it is desired to adjust operations of the miners in the mining center dynamically and adaptively based on the electricity price information and the cryptocurrency price information. In some embodiments, mining difficulty information may be an additional factor for determining the operation control parameters.

The operation control parameters further include arranging a shutdown sequence of the group of target miners so that they are all turned off within a short time period (e.g., 3 minutes) with less/minimum impact/disturbance on the power system. For example, in a mining center with modular design, 5 mining modules are running at 60% capacity for mining a first type of cryptocurrency. The controller device may determine to turn off half of total miners corresponding to the first type of cryptocurrency (e.g., upon obtaining an analysis result based on various factors, upon receiving a notice from the retailer corresponding to a credit program). The operation control parameters may include scheduling to turn off 10% of miners in each of the 5 operating mining modules at time stamps of t0+10 s, t0+30 s, and t0+50 s, t0 being a current time, s representing seconds. The specified time period may be less than a refreshing interval of the electricity real-time price (e.g., 5-15 minutes). As the electricity real-time price refreshes in a relatively short time period (e.g., 5 minutes to 15 minutes), the scheduled time corresponding to shutdown sequence can make sure the mining center can timely respond to the real-time price change, so that the mining center is not charged for any unexpected consumption, and the request of the electricity retailer corresponding to the credit program can be fulfilled in a safe and efficient manner.

The operation control parameters may identify a group of target cryptocurrency miners whose operation states need to be adjusted after analyzing the electricity price information, the cryptocurrency price information, and/or the mining difficulty information. For example, some miners may be turned on, some other miners may be turned off, some other miners may be adjusted from normal operation state to energy-saving state, and/or yet some other miners may be adjusted from energy-saving state to a turbo operation state. In some embodiments, a comprehensive analysis of the electricity price information, the cryptocurrency price information, and the mining difficulty information is performed for determining the operation control parameters.

The analysis of the electricity price information, the cryptocurrency price information, and/or the mining difficulty information aims to achieve a cost-effective solution of allocating the mining activities at the mining center, such as increasing or maximizing a net income of the mining center (e.g., a difference by subtracting a cost of electricity consumed or to-be-consumed by the cryptocurrency mining center during a specific time period from the profit gained or projected to gain from the mined or to-be-mined cryptocurrencies during said specific time period).

In one embodiment, an increase of the electricity real-time price may lead to an adjustment of the operation control parameters for shutting down some miners and/or switching some miners into energy-saving mode. Assuming that the cryptocurrency price and the mining difficulty are relatively stable, the operation control parameters may be determined to ensure that a total power consumption of the cryptocurrency mining system when the electricity real-time price is at a first price is less than the total power consumption when the electricity real-time price is at a second price, the first price being higher than the second price. For example, the number of miners being turned on (or at an operation mode that is not energy-saving mode) when the electricity real-time price is at the first price may be less than the number when the electricity real-time price at the second price. When the electricity real-time price changes from the second price to the first price, the operation control parameters may be determined to turn off some running miners and/or switching some miners to the energy-saving state to save operation cost. In some occasions, if the mining center has previously purchased (block buy at the electricity lock-in price) electricity corresponding to this time period and the real-time price is higher than the purchased price, it may be more profitable to shut down all the miners and sell the purchased electricity back to the retailer or to other users.

Accordingly, an operation of a target group of cryptocurrency miners are controlled according to the operation control parameters (S706). The operation includes switching between operation states. The operation states may include a running state and an off state. The running state may further include one or more of a normal operation state, an energy-saving operation state, or a turbo operation state. Different operation states correspond to different amounts of power consumption. Ranging from high to zero power consumption, the operation states are turbo operation state, normal operation state, energy-saving operation state, and off state. For example, the switch between operation states may be turning a running miner off, switching from the turbo operation state to the energy-saving operation state, turning on a miner to operate at the normal operation state, or any other suitable switches.

The target group of cryptocurrency miners may include miners located at the same AntBox and/or at the same mining module. For example, when it is determined (e.g., by the controller) to turn off 1200 miners after analyzing the electricity price information and cryptocurrency information, and assuming each AntBox includes 200 miners, the operation control parameters may be determined to turn off 100 miners in each of 12 AntBoxes, or turn off 6 AntBoxes. Further, if one mining module hosts 6 AntBoxes, the operation control parameters may be determined to select two mining modules to turn off half of the corresponding miners therein, or select one mining module to turn off completely by itself. In this way, it is convenient to control and adjust operations of the miners in groups, such as at the AntBox level and/or at the mining module level.

In some embodiments, when the group of target miners are determined, the controller device may further inform the water control system to adjust water flow at the mining module(s) to which the target miners belong. In one example, when determining increased number of miners are switched to running state in a mining module, the water control system may increase the water flow speed at the mining module, or increase the frequency or duration of turning on the water valve at the mining module. In another example, when determining shutting down all miners in at a mining module, the water control system may turn off the water control valve at the mining module.

In some embodiments, the target group of miners may be determined according to the cryptocurrency price information and/or mining difficulty information. Using the same example as described above, when it is determined (e.g., by the controller) to turn off 1200 miners, AntBoxes hosting miners mining a first cryptocurrency with lower mining difficulty and/or a higher market price are kept running, and the controller may select AntBoxes hosting miners mining a second cryptocurrency with higher mining difficulty and/or lower market price.

In some embodiments, assuming other factors (e.g., electricity price and cryptocurrency price) are unchanged or stable (i.e., vary in a small range, such as 5%), when the mining difficulty factor corresponding to a first type of cryptocurrency increases, the operation control parameters may be determined to switch the operation state of a first group of miners mining the first type of cryptocurrency to an operation state that consumes less power; and when the mining difficulty factor corresponding to a second type of cryptocurrency decreases, the operation control parameters may be determined to switch the operation state of a second group of miners mining the second type of cryptocurrency to an operation state that consumes more power.

In some embodiments, the electricity real-time price may be monitored with respect to an electricity price threshold. The controller may compare the electricity real-time price with the electricity price threshold periodically or whenever the electricity real-time price changes. Upon determining that the electricity real-time price becomes greater than the electricity price threshold, the operation control parameters may be determined to indicate that the target group of cryptocurrency miners need to be switched to an operation state that consumes less power than a current operation state. Upon determining that the electricity real-time price becomes equal to or less than the electricity price threshold, the operation control parameter may be determined to indicate that the target group of cryptocurrency miners need to be switched to an operation state that consumes more electricity than the current operation state.

The electricity price threshold may also be adjusted according to the cryptocurrency price information. When the cryptocurrency price is higher, a higher electricity price threshold may be used compared to an electricity price threshold used when the cryptocurrency price is lower.

In some embodiments, determining the operation control parameters includes determining whether to commit to a credit program ahead of a future time period. After determining to commit to the credit program, the target group of cryptocurrency miners may be kept on during the future time period unless notified to be turned off by the electricity retailer. Alternatively, after determining not to commit to the credit program, the operation of the target group of cryptocurrency miners may be controlled according to the electricity real-time price during the future time period.

In some embodiments, besides determining whether to commit to the credit program, a committed amount of power consumption is also determined. The committed amount may be determined according to at least one of electricity prediction price, historical electricity prices or the cryptocurrency price information. For example, the controller may obtain an electricity day-ahead market price or predict, according to the historical electricity prices, the electricity real-time price in the future time period corresponding to the credit program provided by electricity retailer. The predicted electricity price may vary at different segments of the future time period and may be indicated by a price range. An average predicted real-time price may be compared with an average current real-time price to determine the committed amount corresponding to the credit program. For example, if the average predicted price is lower than the average real-time price, it is determined to participate the credit program with a committed amount corresponding to total power of miners projected to be running during the further time period; if the predicted price is higher than the real-time price for at least the amount of the credit value offered by the electricity retailer, it is determined to skip the credit program; and if the predicted price is higher than the real-time price for no more than the amount of the credit value offered by the electricity retailer, it is determined to assign a certain portion of the total power of miners projected to be running as the committed amount. Further, the cryptocurrency price may be another factor to be analyzed in determining the committed amount. For example, if the cryptocurrency price of a first type is relatively stable and profitable recently, a higher committed amount of power consumption corresponding to miners mining the first type of cryptocurrency may be determined compared to committed amount of power consumption corresponding to miners mining a second type of cryptocurrency whose price is volatile.

In some embodiments, when the future time period arrives and becomes present time, the controller may determine a target group of cryptocurrency miners to be turned on during the future time period according to the committed amount of power consumption corresponding to the credit program. The price of the committed amount of power consumption is calculated based on the real-time price and a credit value per unit offered by the credit program. The power consumption of the cryptocurrency mining system is monitored to ensure the committed amount is being used and avoid potential penalty. For example, upon determining that the power consumption of the cryptocurrency mining system is not greater than a threshold amount, cryptocurrency miners included in the target group of cryptocurrency miners may be adjusted. The threshold amount is equal to or greater than the committed amount. In some embodiments, the cryptocurrency miners included in the target group may be selected based on the cryptocurrency price of the cryptocurrency being mined at the mining center. Further, upon receiving a notification from the electricity retailer to stop consuming a specific amount of power, the controller device may determine to turn off a group of cryptocurrency miners corresponding to the specific amount within a short time period (e.g., within 1 minute according to a shutdown sequence).

In some embodiments, when the future time period arrives and becomes present time, the operation control parameters for remaining cryptocurrency miners of the cryptocurrency mining system other than the target group of cryptocurrency miners may be determined according to the electricity real-time price and the cryptocurrency price information.

The cryptocurrency mining system is connected to an electricity grid through a power switch (e.g., MV switch shown in FIG. 6). A number of cryptocurrency miners in the target group is less than a total number of cryptocurrency miners in the cryptocurrency mining system. The operation of the target group of cryptocurrency miners is controlled and adjusted while keeping the power switch on.

Accordingly, the disclosed cryptocurrency mining method and system may provide a cost-effective solution for controlling mining activities at the mining center based on different factors such as electricity price and cryptocurrency price.

The method and system/device provided by the present disclosure according to the embodiments are described in detail above. The principles and implementation manners provided by the present disclosure are described herein by using specific examples. The description of the above embodiments is only used to help understand the method provided by the present disclosure. At the same time, a person skilled in the art will make changes the specific embodiments and the application scope according to the idea provided by the present disclosure. In summary, the contents of the present specification should not be construed as limiting the present disclosure.

What is claimed is:

1. A cryptocurrency mining method, applied to a controller of a cryptocurrency mining system, comprising:
   obtaining electricity price information and cryptocurrency price information, the cryptocurrency mining system comprising a plurality of cryptocurrency miners disposed in mining modular boxes, and the controller, wherein the mining modular boxes have substantially same structure arrangement and each mining modular box include a transformer, a switchgear, panelboards, and Antboxes comprising multiple cryptocurrency miners, each cryptocurrency miner includes one or more hardware processing units configured to mine a corresponding cryptocurrency and a communication module configured to establish a data connection with the controller, each panelboard correspond to one of the Antboxes and is configured to supply power from the switchgear to the corresponding cryptocurrency miners;
   determining operation control parameters of the cryptocurrency mining system according to the electricity price information and the cryptocurrency price information, the electricity price information including a current electricity price and the cryptocurrency price information including a current cryptocurrency price; and
   controlling an operation of a target group of cryptocurrency miners according to the operation control parameters, the operation including switching between operation states, and the operation states including at least a running state that causes the one or more hardware processing units to consume the electrical power at the current electricity price and mine the corresponding cryptocurrency at the current cryptocurrency price and an off state that causes the one or more hardware processing units to stop mining the corresponding cryptocurrency and conserve the electrical power,
   wherein:
   the controller of the cryptocurrency mining system is connected to a server of an electricity provider through a network communication;
   the electricity price information includes electricity real-time price retrieved from the server of the electricity provider; and
   determining the operation control parameters comprises:
   monitoring the electricity real-time price with respect to an electricity price threshold;
   upon determining that the electricity real-time price becomes greater than the electricity price threshold, determining the operation control parameters indicating that the target group of cryptocurrency miners is switched to an operation state that consumes less power than a current operation state; and
   upon determining that the electricity real-time price becomes equal to or less than the electricity price threshold, determining the operation control parameter indicating that the target group of cryptocurrency miners is switched to an operation state that consumes more electricity than the current operation state.

2. The method according to claim 1, wherein determining the operation control parameters comprises:
   adjusting the electricity price threshold according to the cryptocurrency price information.

3. The method according to claim 1, wherein:
   the electricity price information further includes an electricity prediction price and a credit value of a credit program corresponding to a future time period provided by an electricity provider;
   determining the operation control parameters comprises determining whether to commit to the credit program ahead of the future time period; and
   controlling the operation of the target group of cryptocurrency miners comprises:
   after determining to commit to the credit program, keeping the target group of cryptocurrency miners turned on during the future time period unless receiving a turn-off instruction from the electricity provider; and
   after determining not to commit to the credit program, controlling the operation of the target group of cryptocurrency miners according to the electricity real-time price during the future time period.

4. The method according to claim 3, wherein determining whether to commit to the credit program comprises:
   determining a committed amount of power consumption corresponding to the credit program according to at least one of the electricity prediction price, the credit value, historical electricity prices or the cryptocurrency price information.

5. The method according to claim 4, further comprising: when the future time period arrives and becomes present time,
   determining the target group of cryptocurrency miners according to a committed amount of power consumption corresponding to the credit program;
   monitoring a power consumption of the cryptocurrency mining system; and
   upon determining that the power consumption of the cryptocurrency mining system is not greater than a threshold amount, adjusting cryptocurrency miners included in the target group of cryptocurrency miners, the threshold amount being equal to or greater than the committed amount.

6. The method according to claim 5, further comprising: when the future time period arrives and becomes present time,
   determining the operation control parameters for remaining cryptocurrency miners of the cryptocurrency mining system other than the target group of cryptocurrency miners according to the electricity real-time price and the cryptocurrency price information.

7. The method according to claim 1, further comprising:
   obtaining mining difficulty information; and determining the operation control parameters according to the mining difficulty information, the electricity price information and the cryptocurrency price information.

8. The method according to claim 7, wherein determining the operation control parameters comprises:
when the mining difficulty information indicates that a mining difficulty factor corresponding to a first type of cryptocurrency increases, determining the operation control parameters to switch a first group of miners mining the first type of cryptocurrency to an operation state that consumes less electricity; and
when the mining difficulty information indicates that a mining difficulty factor corresponding to a second type of cryptocurrency decreases, determining the operation control parameters to switch a second group of miners mining the second type of cryptocurrency to an operation state that consumes more electricity.

9. A cryptocurrency mining controller device, applied to a cryptocurrency mining system comprising a plurality of cryptocurrency miners disposed in mining modular boxes, the mining modular boxes having substantially same structure arrangement and each mining modular box including a transformer, a switchgear, panelboards, and Antboxes comprising multiple cryptocurrency miners, the controller device comprising:
one or more memories; and
one or more processors configured to perform:
obtaining electricity price information and cryptocurrency price information, the electricity price information including a current electricity price and the cryptocurrency price information including a current cryptocurrency price;
determining operation control parameters of the cryptocurrency mining system according to the electricity price information and the cryptocurrency price information, wherein electrical power of each cryptocurrency miner is supplied through one of the panelboards, and each cryptocurrency miner includes one or more hardware processing units configured to mine a corresponding cryptocurrency and a communication module configured to establish a data connection with the controller device, each panelboard correspond to one of the Antboxes and is configured to supply power from the switchgear to the corresponding cryptocurrency miners; and
controlling an operation of a target group of cryptocurrency miners according to the operation control parameters, the operation including switching between operation states, and the operation states including at least a running state that causes the one or more hardware processing units to consume the electrical power at the current electricity price and mine the corresponding cryptocurrency at the current cryptocurrency price and an off state that causes the one or more hardware processing units to stop mining the corresponding cryptocurrency and conserve the electrical power,
wherein: the electricity price information includes electricity real-time price, and determining the operation control parameters comprises:
monitoring the electricity real-time price with respect to an electricity price threshold;
upon determining that the electricity real-time price becomes greater than the electricity price threshold, determining the operation control parameters indicating that the target group of cryptocurrency miners is switched to an operation state that consumes less power than a current operation state; and
upon determining that the electricity real-time price becomes equal to or less than the electricity price threshold, determining the operation control parameter indicating that the target group of cryptocurrency miners is switched to an operation state that consumes more electricity than the current operation state.

10. The device according to claim 9, wherein determining the operation control parameters comprises:
adjusting the electricity price threshold according to the cryptocurrency price information.

11. The device according to claim 9, wherein:
the electricity price information further includes an electricity prediction price and a credit value of a credit program corresponding to a future time period provided by an electricity provider;
determining the operation control parameters comprises determining whether to commit to the credit program ahead of the future time period; and
controlling the operation of the target group of cryptocurrency miners comprises:
after determining to commit to the credit program, keeping the target group of cryptocurrency miners turned on during the future time period unless receiving a turn-off instruction from the electricity provider; and
after determining not to commit to the credit program, controlling the operation of the target group of cryptocurrency miners according to the electricity real-time price during the future time period.

12. The device according to claim 11, wherein determining whether to commit to the credit program comprises:
determining a committed amount of power consumption corresponding to the credit program according to at least one of the electricity prediction price, the credit value, historical electricity prices or the cryptocurrency price information.

13. The device according to claim 9, wherein the one or more processors are further configured to perform:
obtaining mining difficulty information; and
determining the operation control parameters according to the mining difficulty information, the electricity price information and the cryptocurrency price information.

14. The device according to claim 13, wherein determining the operation control parameters comprises:
when the mining difficulty information indicates that a mining difficulty factor corresponding to a first type of cryptocurrency increases, determining the operation control parameters to switch a first group of miners mining the first type of cryptocurrency to an operation state that consumes less electricity; and
when the mining difficulty information indicates that a mining difficulty factor corresponding to a second type of cryptocurrency decreases, determining the operation control parameters to switch a second group of miners mining the second type of cryptocurrency to an operation state that consumes more electricity.

15. The method according to claim 1, wherein:
the plurality of cryptocurrency miners are physically disposed in different mining modular boxes; and
controlling an operation of a target group of cryptocurrency miners according to the operation control parameters comprises:
determining a quantity of target-type cryptocurrency miners to be switched between the running state and the off state;

selecting multiple boxes of the mining modular boxes that contains the target-type cryptocurrency miners; and selecting a plurality of the target-type cryptocurrency miners from each of the selected multiple mining modular boxes to form the target group of cryptocurrency miners, a total number of the target-type cryptocurrency miners selected from the selected multiple mining modular boxes being the determined quantity of target-type cryptocurrency miners to be switched.

16. The method according to claim 15, wherein:
a number of the target-type cryptocurrency miners selected from each of the selected multiple mining modular boxes are substantially the same.

* * * * *